United States Patent Office 3,504,545
Patented Apr. 7, 1970

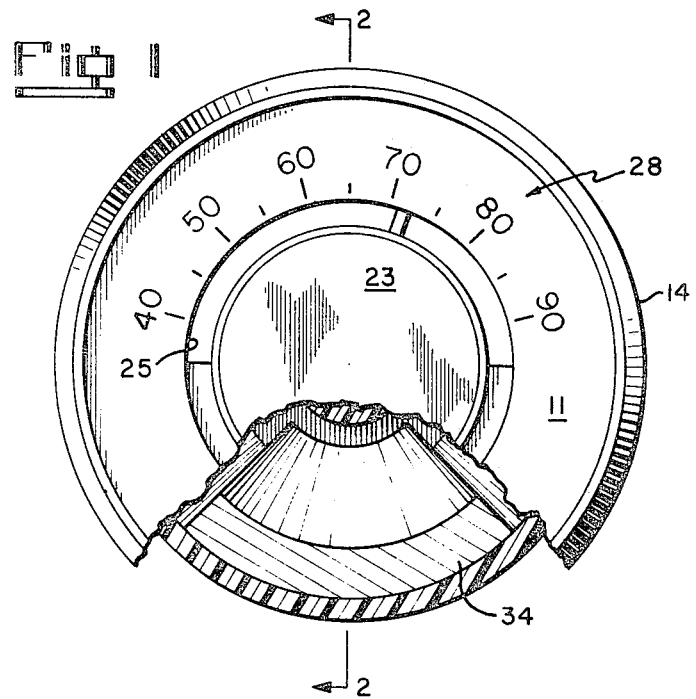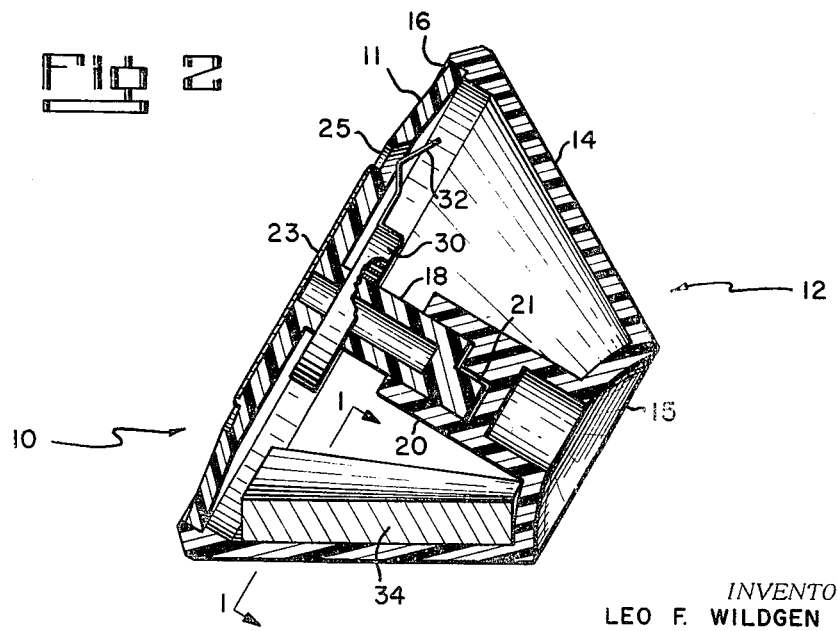

3,504,545
STABILIZED SPACE CONDITION
RESPONSIVE INSTRUMENT
Leo F. Wildgen, Minneapolis, Minn., assignor to Honeywell Inc., Minneapolis, Minn., a corporation of Delaware
Filed Nov. 25, 1968, Ser. No. 778,402
Int. Cl. G01k 1/4
U.S. Cl. 73—363.7       6 Claims

ABSTRACT OF THE DISCLOSURE

A desk thermometer having a scale held at a convenient viewing angle by the body of the instrument which is in the form of a truncated cone. When the conical surface is placed on a desk, the scale is erected by an eccentric weight within the instrument body.

---

This invention is directed to a space condition indicating instrument particularly adapted for use on a desk. The body of the instrument has a conical surface adapted to rest on a desk and an internal weight holds the indicating scale upright. While the illustrative embodiment of the invention is a thermometer, it is understood that it would be equally applicable to other atmospheric condition responsive devices, i.e., humidity and atmospheric pressure. The characteristic of the device to rock when disturbed before returning to its stable position is considered by some to be a desirable feature.

In the drawing, FIGURE 1 is a front elevation view, partly in section, of a desk thermometer, and FIGURE 2 is a sectional view taken along the line 2—2 of FIGURE 1. In FIGURE 2 the thermometer is shown in the position it would assume in use on a horizontal surface such as a desk.

A thermometer suitable for desk use has a housing comprising a front or face portion 10 having a generally convex surface 11 and a body portion 12 having a conically or substantially conically shaped surface 14 and a somewhat concave back 15. The front portion 10 is preferably circular and its periphery is seated in a suitable recess 16 in the forward rim of body portion 12. Face 10 and body 12 are preferably made of a moldable plastic but any suitable materials may be used.

The two portions of the housing are also joined by a post 18 extending rearwardly from the center of face portion 10, which post is received in a recess in a post 20 extending forwardly from the back 15 of body portion 12. Posts 18 and 20 are keyed at 21 to predetermine the angular relation of the front and rear portions of the housing when they are joined. The parts of the housing may be secured together with a suitable cement or adhesive between face 10 and body 12 or between posts 18 and 20.

A circular metal disk 23 covers the center of face portion 10 for purely decorative purposes. A partial annular slot 25 through face portion 10 coaxial with the body portion 12 extends slightly beyond the ends of the indicia of scale 28 and provides a window for viewing the position of the thermometer pointer, to be described. Scale 28, including suitable indicia of temperature, is disposed on the surface 11 adjacent the outer edge of slot 25. A spiral bimetal element 30 is carried by post 18 spaced slightly from the front or face portion 10. The outer end of bimetal element 30 carries a pointer 32 visible through the slot 25 and cooperating with the scale 28 to indicate temperature. Instead of slot 25, a portion or all of face portion 10 may be transparent.

A weight 34 is carried within the housing and is suitably secured to the lower portion of body portion 12 as by a cement or adhesive. The weight 34 is disposed within the housing with its center of gravity spaced from the body axis in a direction opposite the center of scale 28 so that when the housing is placed with its conical surface on a horizontal surface, the weight will tend to move to the lowest possible position and in so doing move the scale to an upright or erect position. Also, the weight is of increased width toward the front of the housing so that the housing will be stable in a fore and aft direction when resting on a horizontal surface and in the position shown in FIGURE 2 and will resist accidental tipping onto its back 15. The key 21 between posts 18 and 20 assures assembly of the two housing portions with the weight 34 properly disposed with respect to the scale 28, the weight having been secured to the body in a predetermined relation to the key.

Normal use of the thermometer will be in the position shown in FIGURE 2. In this position, the frusto-conical surface of the rear housing portion 12 rests on a horizontal desk surface with the face 11 and scale 28 disposed at a convenient viewing angle. As mentioned above, the instrument will rock back to its stable position if disturbed rather than returning abruptly.

The embodiments of the invention in which an exclusive property or right is claimed are defined as follows:

1. An atmospheric condition indicating instrument comprising, a housing having a substantially conical peripheral surface and a substantially circular front face, said conical peripheral surface being free of obstructions so that said housing may rest on said peripheral surface on a flat horizontal surface, a condition sensing element carried within the housing behind the front face and having a poniter movable with respect to the front face, a scale on the front face of the housing provided with indicia of condition value cooperating with the pointer, the front face having an area through which the pointer can be viewed, and a weight within the housing disposed eccentric to the axis of the housing on the side thereof opposite the scale, whereby the housing is stable when resting on the conical surface with the scale and indicia erect.

2. An instrument in accordance with claim 1 in which the pointer of the condition sensing element moves arcuately about the conical axis and the scale on the front face is arcuate.

3. An instrument in accordance with claim 2 in which the front face of the housing is provided with an arcuate slot adjacent the scale through which the pointer is visible.

4. An instrument in accordance with claim 2 in which the condition sensing element is a spiral bimetal element carried by a post extending rearwardly from the front face of the housing.

5. An instrument in accordance with claim 1 in which the housing is frusto-conical.

6. An instrument in accordance with claim 2 in which the housing is frusto-conical.

References Cited
UNITED STATES PATENTS

| 1,838,962 | 12/1931 | Schlaich | 73—363.7 |
| 2,091,693 | 8/1937 | Spencer | 73—353 |
| 3,214,975 | 11/1965 | Solecki | 73—336 |

LOUIS R. PRINCE, Primary Examiner
D. M. YASICH, Assistant Examiner

U.S. Cl. X.R.
73—343